No. 725,759. PATENTED APR. 21, 1903.
V. R. McDOLE & A. HOLLENBECK.
CORN HARVESTING MACHINE.
APPLICATION FILED AUG. 2, 1901.

NO MODEL. 6 SHEETS—SHEET 1.

Witnesses
Inventors

No. 725,759. PATENTED APR. 21, 1903.
V. R. McDOLE & A. HOLLENBECK.
CORN HARVESTING MACHINE.
APPLICATION FILED AUG. 2, 1901.
NO MODEL. 6 SHEETS—SHEET 5.

UNITED STATES PATENT OFFICE.

VERNERD R. McDOLE, OF AURORA, ILLINOIS, AND ALMERION HOLLENBECK, OF WALWORTH, WISCONSIN.

CORN-HARVESTING MACHINE.

SPECIFICATION forming part of Letters Patent No. 725,759, dated April 21, 1903.

Application filed August 2, 1901. Serial No. 70,575. (No model.)

*To all whom it may concern:*

Be it known that we, VERNERD R. McDOLE residing at Aurora, in the county of Kane and State of Illinois, and ALMERION HOLLENBECK, residing at Walworth, in the county of Walworth and State of Wisconsin, citizens of the United States, have invented certain new and useful Improvements in Corn-Harvesting Machines, of which the following is a full, clear, and exact specification.

Our invention relates to that class of corn-harvesters designed for pulling the ears from the stalks as the latter stand in the field; and it has for one of its important objects to provide improved means which will produce a stripping action on the stalks or husks while passing along a standing row, and thus strip or snap off the ears, while leaving the stalks in the field.

Another object of our invention is to provide improved and simple means for lifting reclining stalks to an upright position, whereby they may be acted upon by the stripping or snapping rolls.

Another object of our invention is to provide an improved flexible shield or deflector for directing the ears and loose corn into the elevator, which while being of the required form and construction for catching, and thus guiding the loose corn, will be sufficiently flexible to permit the standing stalks to pass to the snapping or stripping rolls.

Another object of our invention is to so arrange the snapping or stripping rolls as to cause the stalks to pass between them gradually and not in a bunch, whereby the stalks will be acted upon individually and the rolls will not be spread apart by the bunching of the stalks to such an extent as to allow the ears to pass between the rolls without being snapped off.

With these ends in view our invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Fig. 13ª is a detail perspective view of the deflector-leaves associated. Fig. 16 is a side elevation of the machine.

According to this invention the ears of corn are stripped or snapped from the standing stalks by means of a pair of snapping or stripping rolls 1 2, which are arranged substantially parallel with each other with their adjacent sides moving rearward and in contact or very close together. These rolls are journaled in a forwardly-inclined overhanging or upright position and are carried on the machine lengthwise of the row of standing corn in such a manner that the stalks will pass between them, or, more properly speaking, they will pass on opposite sides of the stalks, and these rolls being revolved in opposite directions or toward each other on the front side and from each other on the rear side and their operating-faces rearward of the machine it will be seen that as the stalks and husks come between them they will exert a tendency to roll along the stalks, squeezing the stalks between them and snapping or stripping off the ears, which being of larger diameter than the stalks and being less compressible will be severed from their connection with the stalks before the rolls can exert sufficient grip upon them to pull them through. In order that the rolls may exert the requisite grip upon the stalks and the husks for preventing slipping and pulling them through, the rolls are each provided with longitudinal grooves 3; but they are so relatively arranged that even though the rolls may be pushed firmly together the ribs constituted on one of the rolls by said grooves cannot mesh with the grooves in the other roll. The lower ends of these rolls 1 2 are provided with journals 4 5, which are mounted in spring-arms 6 7, respectively, composed of any suitable flexible material, so that the rolls may move apart at their lower ends to enable them to yield more or less, and thus adapt the machine for stalks of various sizes, the spring-arms 6 7 being of sufficient tension, however, to strip or snap off the ears without letting them pass through the rolls. The arms 6 7 may be supported in any suitable manner. They are shown secured to longitudinal beams 8 9, respectively, and, as appears in Fig. 6, these arms are so bent as to constitute guides for directing the stalks between the rolls as the beams 8 9 pass on either side of the standing row.

The upper ends of the rolls 1 2 are provided with journals 10 11, mounted in journal-boxes 12 13, respectively. The box 12 is arranged in a slot or way 14, formed in a bracket 15, secured to an overhead beam 16 of the frame or to any other suitable support, so that the upper end of the roll 1, as well as its lower end, will be capable of moving toward and from its companion roll, and in order that it may be held up to its work against its companion roll any suitable spring or cushion, such as coil-spring 17, may be interposed between the box 12 and the end of an adjusting-screw 18, secured in the end of bracket 15. The box 13 is mounted in a slot 19 in bracket 15, but is held against bodily movement, though in order that it may turn or oscillate to accommodate the oscillatory motion of the lower end of roll 2 it is pivoted in its support by pivot-bolt or other suitable device 20. To the journal 11 is secured a spur-gear 21, which meshes with a similar gear 22 on the journal 10 for causing the rolls to revolve in unison and in opposite directions or toward each other on the front side, and the journal 11 is driven by any suitable connection with one of the ground-wheels 23. In the example of the invention shown in the drawings the axle 24 of said ground-wheel is provided with a sprocket 25, which is geared to a sprocket 26 by means of chain 27, and sprocket 26 is secured to shaft 28, mounted on frame member 16 and carrying a bevel-pinion 29, which meshes with a companion bevel-pinion 30 on the journal 11, so that the snapping or stripping rolls will be revolved at front toward each other in such a manner and at such a rate of speed as to give them the power of seizing the stalks and feeding the latter between them as the machine proceeds along the standing row.

The forwardly-inclined rolls located in the same plane have an advantage by their position with relation to the standing corn over vertically-arranged rolls in that the reclining stalks pass through at once and not endwise. With corn-harvesters of this character it is found that where the stalks pass between the rolls endwise a large number of them will become bunched and pass through at one time, thus clogging the rolls and spreading them apart such a great distance as to render the rolls ineffectual in snapping off the ears. Inasmuch, therefore, as it is impossible to keep the cornstalks standing in a vertical position while the deflectors and other parts of the machinery are brushing past them, it becomes necessary to tip the tops of the rolls forwardly, so as to bring the rolls approximately parallel with the inclined stalks.

Figure 6:
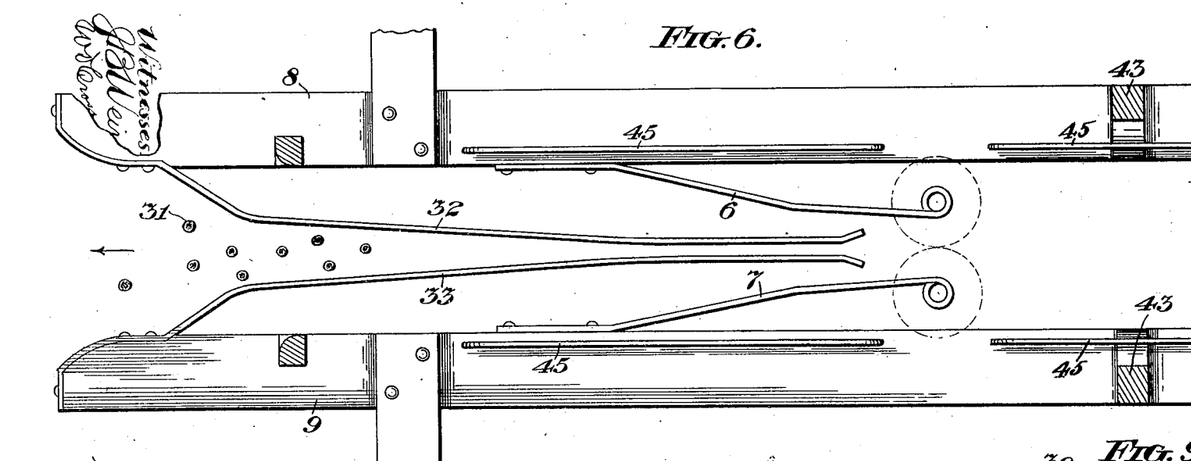
Fig. 6 is a detail plan view of the beams or frames which support the deflectors and the snapping-rolls, the arrow indicating the direction in which machine is moved.

As the machine advances in the direction of the arrow in Fig. 6 the beams 8 9 pass on either side of the standing stalks, which are indicated in Fig. 6 at 31, and a pair of guide plates or arms 32 33 gather together any straggling stalks and stand them up more or less in single-file fashion, so that they will be in a form more appropriate for being acted upon by the snapping-rolls, which are most effective when they receive the stalks in this order. The outer or forward ends of the guide-arms 32 33 are secured to the beams 8 9, while their inner ends gradually converge toward the guide-arms 6 7. The lower ends of the snapping-rolls 1 2 are arranged as close to the ground as practicable, so as to be below the average height of the ears on the stalks, and in order that they may exert a tendency to lift up reclining stalks their lower ends are tapered and provided with right and left threads or curved grooves 34, which when engaging a stalk exert a tendency to work the stalk upwardly between the corrugated surfaces of the rolls.

Figure 1:
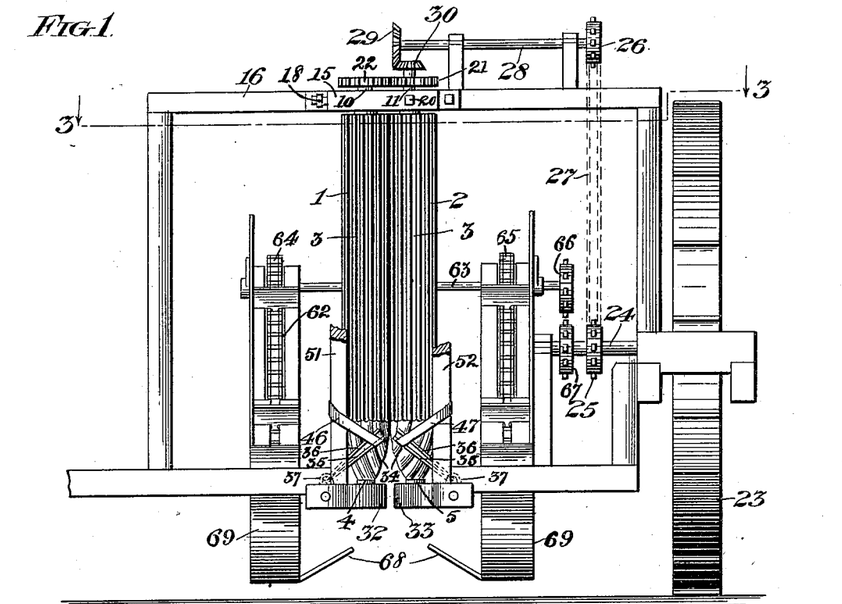
Figure 1 is a front view of a part of a corn-harvester frame equipped with our improvements.
Figure 2:
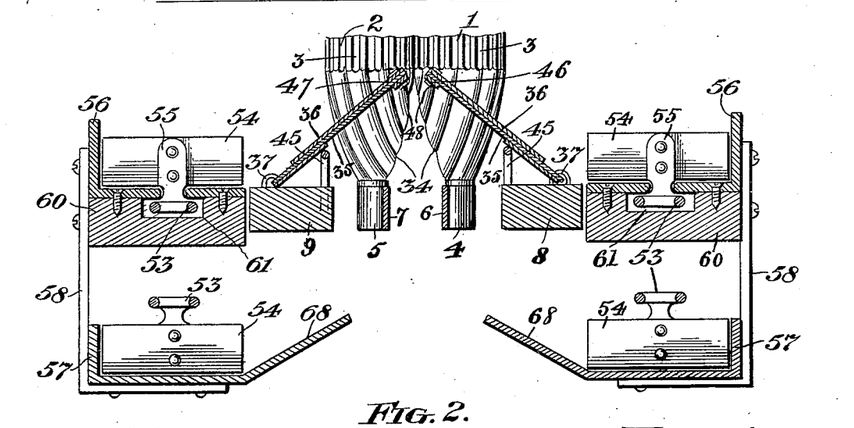
Fig. 2 is an enlarged detail transverse sectional view taken on the line 2 2, Fig. 3, looking in the direction of the arrows.
Figure 3:
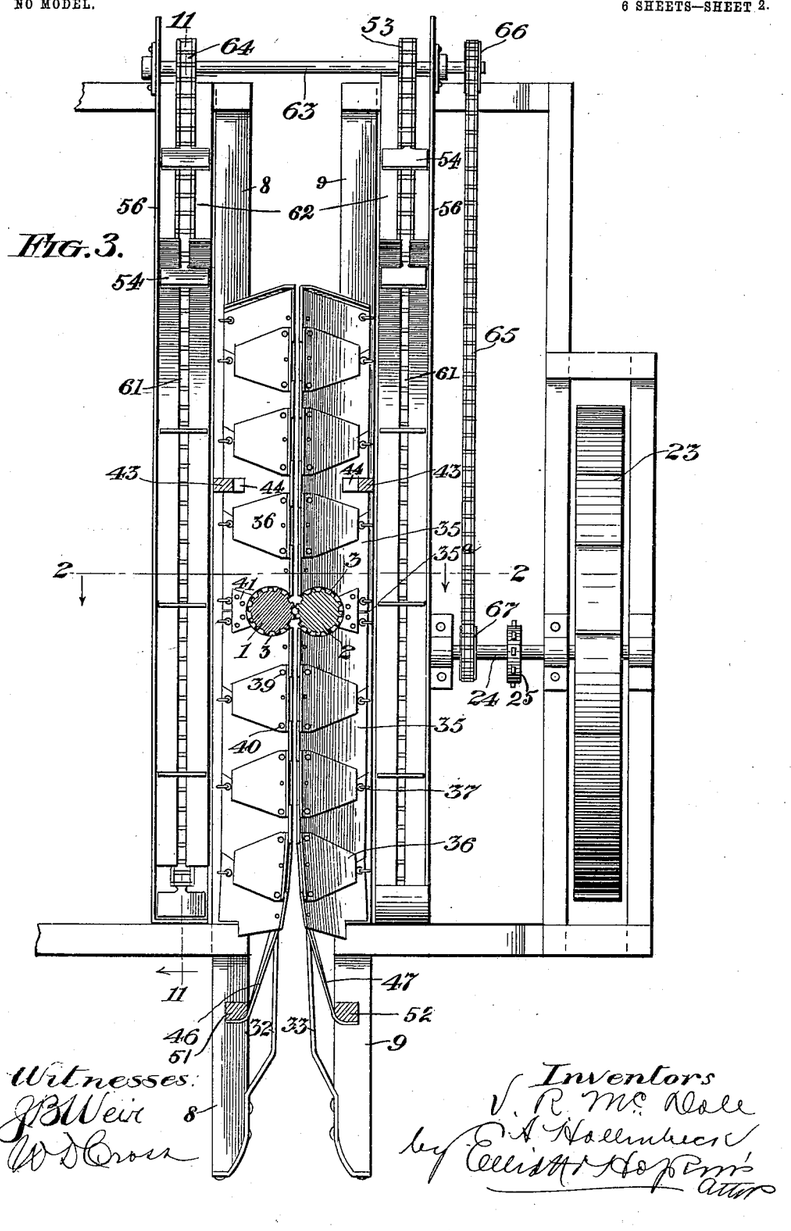
Fig. 3 is an enlarged plan section of the mechanism shown in Fig. 1, taken on the line 3 3, Fig. 1, looking in the direction of the arrows.
Figure 4:
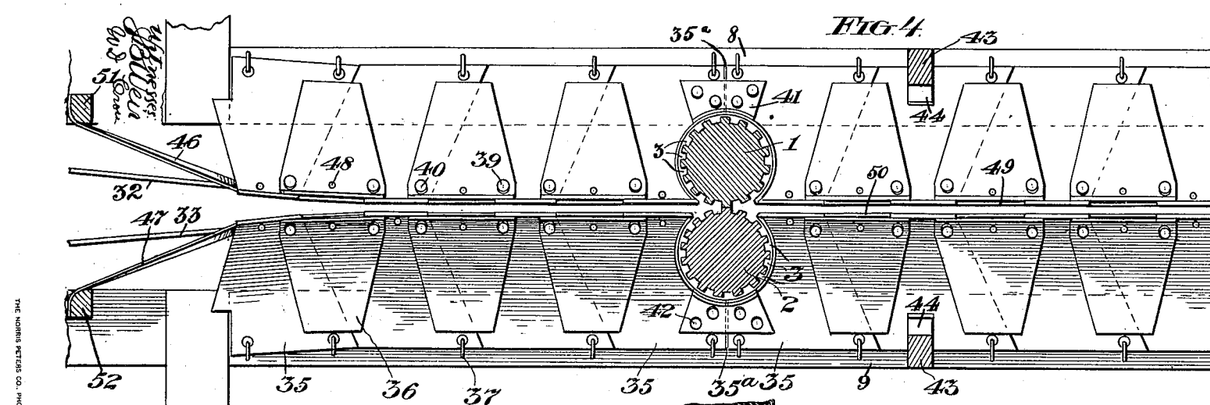
Fig. 4 is an enlarged detail plan section of the snapping-rolls and the flexible deflector hereinafter described.
Figure 5:
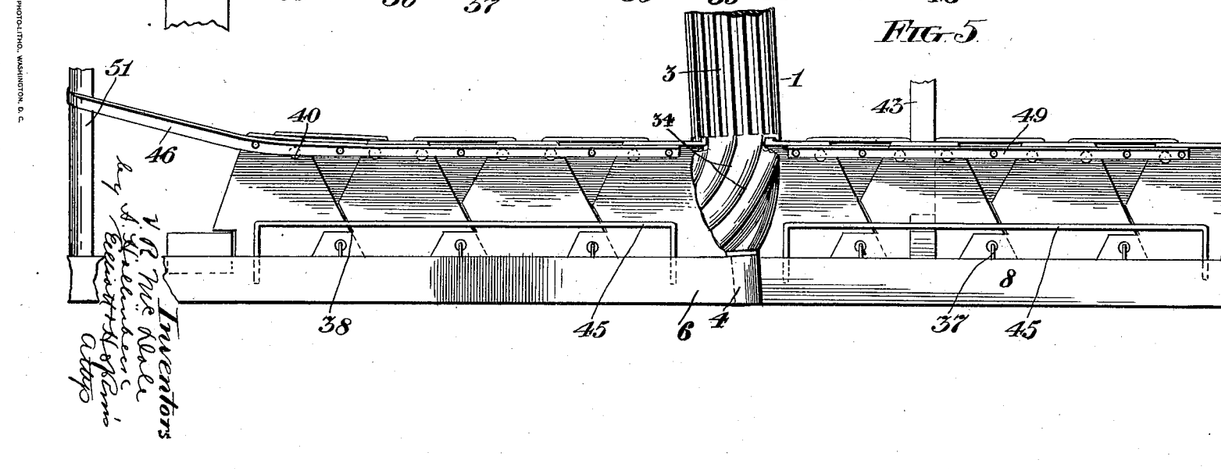
Fig. 5 is a side elevation of one-half thereof looking from the inner side.
Figures 7, 8, 9, 10:
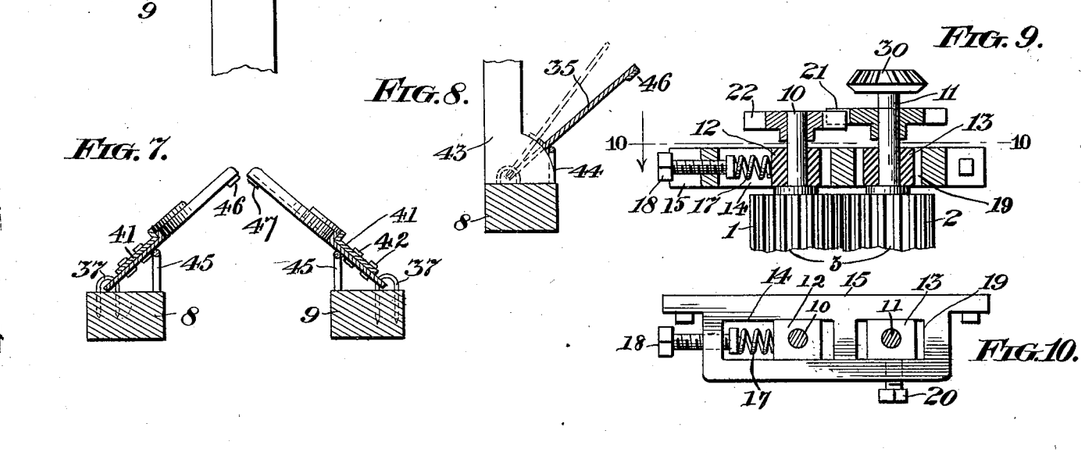
Fig. 7 is a detail transverse section of the deflectors and their supporting-beams.
Fig. 8 is a detail transverse section of one of the supporting-beams and deflector-blades, showing the joint between the latter and one of the standards on the supporting-beam.
Fig. 9 is a detail view of the upper ends of the snapping or stripping rolls, showing the adjustable bearings in section.
Fig. 10 is a plan section thereof, taken on the line 10 10, Fig. 9, looking in the direction of the arrows.
Figures 11, 13A:
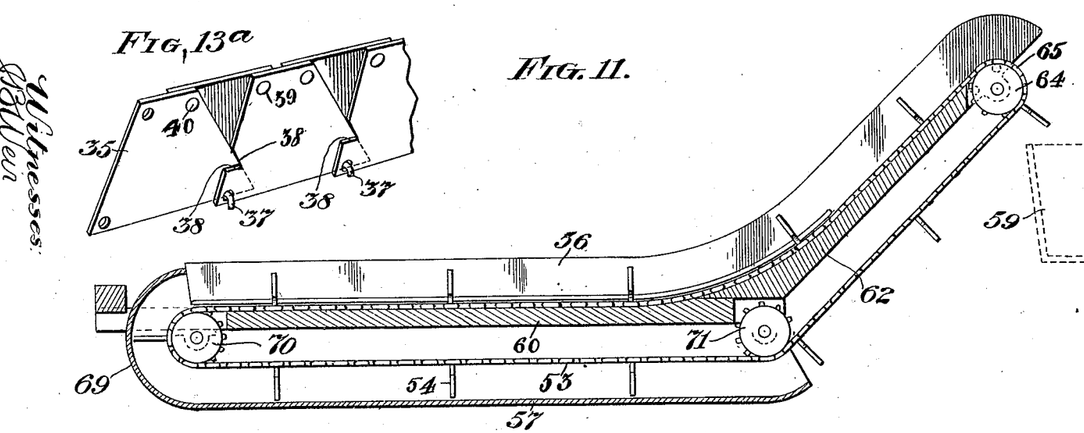
Fig. 11 is a vertical longitudinal sectional view of one of the elevators, taken on the line 11, Fig. 3, looking in the direction of the arrows.
Figure 12:
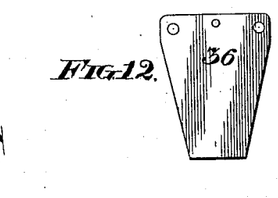
Fig. 12 is a detail view of one of the deflector-leaves.
Figure 13:
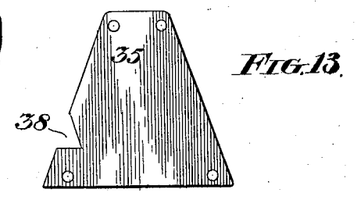
Fig. 13 is a detail view of another one of the deflector-leaves.
Figure 14:
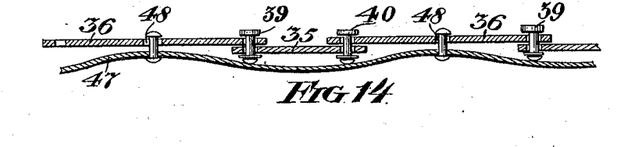
Fig. 14 is a longitudinal sectional view of a part of one of the deflectors, showing the manner of pivotally securing the leaves together.
Figure 15:
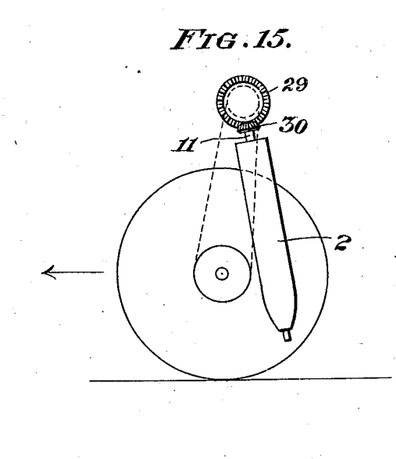
Fig. 15 is a diagrammatic illustration showing the relative inclined arrangement of the snapping-rolls and the ground-wheels of the corn-harvester.

Arranged over the guide-arms 32 33 and supported upon the beams 8 9 are two deflectors, which converge at their upper edges in line with the line between the rolls, thus constituting two inclines extending in both directions from the rolls for catching the ears of corn as the latter fall from the rolls and deflecting them to either side into the corn-elevators, which will be presently described, or into any other suitable receptacle. These deflectors are each constituted by two series of leaves 35 36, flexibly connected together, and the description of one of these deflectors, therefore, will suffice for both. The lower end of each of the leaves 35 is by its corners loosely hinged to one of the beams 8 9 by means of eyes or hooks 37, and they are of substantially triangular formation, as shown in Figs. 13 13ª, with their lower corners overlapped, so that each one of the hooks or eyes 37 serves not only to connect them to the beam, but also serves for connecting them together, and in order that each of the leaves 35 may be capable of moving upwardly or outwardly at its upper end a limited distance independently of each of the others the under side of each is notched, as shown at 38, at a point considerably above its lower edge, so that its lower edge may still remain under or overlapped by the contiguous leaf 35, and thus serve to constitute at this point a continuous unbroken deflecting-surface, while allowing the bottom leaf to rise a limited degree independently of the top leaf, it being understood that each leaf 35 has one edge (the notched edge) arranged below the contiguous leaf 35, while its other edge is arranged over the contiguous notched edge on that side. The leaves 35 when thus put together have V-shaped openings between their upper ends, and these openings are overlapped on one side by the leaves 36, which taper downwardly, their larger ends being arranged in line with the upper ends of the leaves 35 and flexibly and loosely pivoted or jointed thereto in any substantial manner which will permit of freedom of movement of the independent leaves. For this purpose it is preferable to employ loose rivets 39 40, which pass through both leaves 35 36 at the upper ends thereof, the lower ends of the leaves 36 being loose and resting by gravity against the upper faces of the leaves 35, one of said leaves 36 being employed over each of the V-shaped spaces between contiguous leaves 35 and serving also to cover the notch 38. These deflectors extend both forwardly and rearwardly of the snapping-rolls 1 2, and where they pass the rolls they are cut away to conform to the contour thereof, as shown in Fig. 4, so as to avoid the possibility of the ears and loose corn falling between the rolls and the contiguous edges of the deflectors. The contiguous leaves 35 at the rolls 1 2 are not overlapped with one another, as before described; but their contiguous edges are divided from each other vertically, as shown at 35ª, and they are flexibly secured together by an overlapping plate 41, secured to the contiguous leaves 35 by loose rivets 42 or any other suitable means. Where the deflectors pass the upright frame members 43, which are desirable for supporting the longitudinal beams 8 9 and sustaining parts of the superstructure, the construction shown in Fig. 8 may be resorted to for avoiding any space being left between the deflector-leaves and said standards or hangers 43, while at the same time allowing the requisite freedom of movement of the deflectors. In this construction it will be seen that the lower end of the standard or hanger 43 is struck on an arc 44, concentric with the arc described by the leaf 35, through which the hanger passes, and the aperture in the leaf for the reception of the hanger is only as wide as the hanger laterally and as long as the radius of the arc 44. All of the deflector-leaves of both deflectors are limited in their downward or approaching movement by means of supports or stops 45, secured to the beams 8 9, respectively, both in front and to the rear of the rolls 1 2. The guide bars or arms 32 33 serve to direct the stalks between the deflectors, and in order that the stalks and husks may not catch on the upper edges of these deflectors where joined together such edges may be faced on the inner sides with straps 46 47, composed of leather, flexible metallic bands, or other suitable material, riveted or attached otherwise at suitable intervals to the deflectors by means of rivets 48, the bands 46 47 being sufficiently flexible and sufficiently full in length to allow the desired freedom of movement of the individual deflector-leaves, while at the same time constituting a smooth even surface or runner for engaging the sides of the stalks as the rolls 1 2 approach them. The after ends of the deflectors are likewise faced along their upper inner edges with similar bands 49 50. The forward ends of the bands 46 47 are carried apart or diverged, as shown in Fig. 4, and secured to stanchions 51 52, respectively, so that these extended ends may also constitute guides for gathering the stalks together and directing them between the deflectors. The stanchions 51 52 may be supported in any suitable manner, as by means of the beams 8 9. With deflectors thus constructed it will be seen that the leaves constituting the same lie sufficiently close together to prevent any shelled corn from passing between them, while at the same time they are sufficiently flexible to allow of the free passage of the machine along the standing row without serious obstruction or interference. As the ears and shelled corn fall from the snapping-rolls upon the deflectors, the same gravitate in either direction onto the elevators, which will now be described. As better shown in Figs. 1 and 2, at the outer side of each of the beams 8 9 is arranged one of these corn-elevators, consisting of any suitable endless conveyer or chain 53, having paddles or blades 54 secured thereto in any suitable way, as by means of shanks 55, and adapted to scrape along the bottoms of upper and lower troughs 56 57, secured one above the other in any suitable way, as by means of one or more brackets 58. The lower end of this conveyer or elevator is arranged in a horizontal position parallel and coterminous with the deflectors, so that any corn falling on either side of the rolls will be received by some part of the elevator and conducted upwardly and deposited in any suitable receptacle, (partly indicated in dotted lines at 59 in Fig. 11.) The conveyer or elevator is guided in this course by means of a bracket or guideway, which is horizontal throughout the length of the deflectors and gradually ascends at the rear end of the deflectors to the receptacle 59, where the elevator-conveyer turns and descends into the lower trough 57, which is also horizontal and coterminous with the deflectors. This track or guideway is composed of a bar 60, provided with a groove 61 for the reception of the chain 53, and this groove is partially overlapped by the edges of the upper trough 56, as shown in Fig. 2, so as to engage over the chain 53 and hold the latter in place. This bar 60 gradually rounds upwardly into an ascending portion 62, which constitutes a support for the upwardly-extending sides of the trough 56; but the bottom of this trough need not be carried to the top of the member 62, because after the chain or conveyer ascends beyond the turn between the horizontal and the upright portions of the guideway it will lie flat in contact with the member 62 by force of gravity. These elevators may be driven continuously by any suitable connection or gearing with one of the ground-wheels 23. In the example shown in the drawings a single shaft 63 passes through the two sprockets 64, which carry the upper ends of the elevator-chains, respectively, and imparts motion to said sprockets and chains from the axle 24, with which it is connected by sprocket 66, chain 65, and sprocket 67.

Any shelled corn that might find its way between the leaves of the deflectors or through the space between the beams 8 9 and the elevator-troughs 56, which latter are of course open on the sides adjacent to the deflectors, will be caught by inclined shelves 68, projecting inwardly along the beams 8 9 from the inner edges of the lower troughs 57, thus directing such shelled corn into the path of the paddles 54 as the latter pass along the troughs 57, where it will be caught and gradually carried upwardly into the upper troughs 56, which are connected to the lower troughs 57 by rounded ends 69, where the chains pass around sprockets 70, similar sprockets 71 being arranged at the opposite end of the horizontal portions of the chains and engaging with the lower folds thereof.

Having thus described our invention, what we claim as new therein, and desire to secure by Letters Patent, is—

1. In a corn-harvester, the combination of a pair of contiguous, forwardly and upwardly inclined, overhanging, snapping or stripping rolls, both located in a plane at right angles to a vertical plane through the line of travel of the harvester, means for revolving said rolls toward each other along the corn-row, and means for catching the ears, substantially as set forth.

2. In a corn-harvester, the combination of means for snapping or stripping the ears from the stalks, and a flexible deflector arranged lengthwise of the line of movement of the harvester and comprising a series of loosely-connected, independently-movable leaves, and a strap or continuous connection common to a plurality of said leaves and arranged along the faces thereof, contiguous to the stalks, substantially as set forth.

3. In a corn-harvester, the combination of means for snapping or stripping the ears from the stalks, and a flexible deflector arranged lengthwise of the line of movement of the harvester and comprising a series of tapering leaves hinged at their lower ends, and also loosely connected together, and a series of tapering leaves loosely connected to the upper ends of said first leaves, each of said second leaves overlapping two of the other leaves, substantially as set forth.

4. In a corn-harvester, the combination of a pair of stripping or snapping rolls and deflectors arranged lengthwise of the line of movement of the harvester and through which deflectors said rolls pass, substantially as set forth.

5. In a corn-harvester, the combination of means for snapping or stripping the ears from the stalks, a pair of independently-movable deflectors inclined in opposite directions and arranged lengthwise of the line of movement of the harvester, and comprising flexible straps secured along their contiguous upper edges, the forward outer ends of said straps being supported in divergent positions for gathering the stalks and directing the same between said deflectors, substantially as set forth.

6. In a corn-harvester, the combination of means for stripping the ears from the stalks, means for catching the ears as they fall from said stripping means, an elevator for receiving the corn from said catching means, and an incline projecting under said catching means for receiving the loose corn and directing the same into said elevator, substantially as set forth.

7. In a corn-harvester, the combination of means for stripping the ears from the stalks, means for catching the ears as they fall from said stripping means, an elevator comprising an upper and a lower portion, both arranged horizontally, and a continuous conveyer traveling along said upper and lower portions and having means for pushing the corn therealong, and an incline projecting from the edge of said lower portion inwardly under said catching means, substantially as set forth.

8. In a corn-harvester, the combination of means for stripping the ears from the stalks, a horizontally-arranged deflector for catching the ears as they fall from said stripping means, and an elevator for receiving the ears from said deflector having a portion arranged in a horizontal position lengthwise of the lower edge of said deflector and comprising the horizontally-grooved member 60, a slotted trough arranged along said member 60, a conveyer-chain running in the groove of said member and having shanks projecting through the slot of said trough, and paddles secured to said shanks, substantially as set forth.

9. A corn-harvester comprising longitudinal beams, a pair of rearwardly-converging spring-arms secured to the beams, a pair of stripping-rolls journaled in and supported on the free ends of the spring-arms, and yielding and pivoted journal-bearings respectively for the upper ends of the stripping-rolls, substantially as set forth.

10. A corn-harvester comprising longitudinal beams, a pair of rearwardly-converging spring-arms secured to the beams, a pair of forwardly-inclined overhanging stripping-rolls journaled in and supported on the free ends of the spring-arms and bearings in which the upper ends of the stripping-rolls are journaled, substantially as set forth.

11. A corn-harvester comprising longitudinal beams, a pair of rearwardly-converging spring-arms secured to the beams, a pair of stripping-rolls journaled in and supported on the free ends of the spring-arms, bearings in which the upper ends of the rolls are journaled, and the rearwardly-converging guide-plates secured to the beams and having their free ends extending to a point between the spring-arms adjacent to the rolls, substantially as set forth.

12. A corn-harvester comprising longitudinal beams, a pair of rearwardly-converging spring-arms secured to the beams, a pair of stripping-rolls journaled in and supported on the free ends of the spring-arms, an overhead beam, a bracket having slots and secured to the overhead beam and bearings located in the slots and in which the upper ends of the rolls are journaled, substantially as set forth.

13. A corn-harvester comprising longitudinal beams, a pair of rearwardly-converging spring-arms secured to the beams, a pair of stripping-rolls journaled in and supported on the free ends of the spring-arms, an overhead beam, a bracket having slots and secured to the overhead beam, and a spring-pressed sliding bearing and a pivoted bearing located in the respective slots and in which the upper ends of the rolls are journaled, substantially as set forth.

14. A corn-harvester comprising longitudinal beams, a pair of stripping-rolls, yielding bearings whereby the rolls are supported between the beams, the longitudinal stops secured to the beams and the inclined deflectors composed of loosely-connected plates and loosely connected with the beams, supported on the stops and adapted to rise and fall to sustain the passing stalks, substantially as set forth.

15. A corn-harvester comprising longitudinal beams, stanchions secured to the forward ends of the beams, a pair of stripping-rolls, yielding bearings whereby the rolls are supported between the beams, the longitudinal stops secured to the beams, the inclined deflectors composed of loosely-connected plates and loosely connected with the beams, supported on the stops and adapted to rise and fall to sustain the passing stalks, and the guide-strips secured to the stanchions, converging rearwardly and secured to the upper edges of the deflectors, substantially as set forth.

16. A corn-harvester comprising longitudinal beams, stanchions secured to the forward ends of the beams, a pair of rearwardly-converging spring-arms secured to the beams, a pair of stripping-rolls journaled in and supported on the free ends of the spring-arms, journal-bearings for the upper ends of the stripping-rolls, the longitudinal stops secured to the beams, the inclined deflectors loosely connected with the beams, supported on the stops and adapted to rise and fall to sustain the passing stalks, and the guide-strips secured to the stanchions, converging rearwardly and secured to the upper edges of the deflectors, substantially as set forth.

17. A corn-harvester comprising longitudinal beams, stanchions secured to the forward ends of the beams, a pair of rearwardly-converging spring-arms secured to the beams, a pair of stripping-rolls journaled in and supported on the free ends of the spring-arms, bearings in which the upper ends of the rolls are journaled, the rearwardly-converging guide-plates secured to the beams and having their free ends extending to a point between the spring-arms adjacent to the rolls, the longitudinal stops secured to the beams, the inclined deflectors loosely connected with the beams, supported on the stops and adapted to rise and fall to sustain the passing stalks, and the guide-strips secured to the stanchions, converging rearwardly and secured to the upper edges of the deflectors, substantially as set forth.

18. A corn-harvester comprising stripping-rolls, upper and lower troughs at the sides of the rolls, upward extensions to the upper troughs, conveyers working through the upper and lower troughs and through the extensions, and deflectors located between the rolls and the upper troughs, substantially as set forth.

19. A corn-harvester comprising stripping-rolls, upper and lower troughs at the sides of the rolls, upward extensions to the upper troughs, inclined wings to the lower troughs, conveyers working through the upper and lower troughs and through the extensions, and deflectors located between the rolls and the upper troughs, substantially as set forth.

VERNERD R. McDOLE.
ALMERION HOLLENBECK.

Witnesses:
F. A. HOPKINS,
W. D. CROSS.